(12) United States Patent
Buch et al.

(10) Patent No.: US 10,147,445 B1
(45) Date of Patent: Dec. 4, 2018

(54) DATA STORAGE DEVICE WITH ONE OR MORE DETECTORS UTILIZING MULTIPLE INDEPENDENT DECODERS

(71) Applicant: Seagate Technology LLC, Cupertino, CA (US)

(72) Inventors: Bruce Douglas Buch, Westborough, MA (US); Mark Allen Gaertner, Vadnais Heights, MN (US); Jon D. Trantham, Chanhassen, MN (US); Mehmet Fatih Erden, St. Louis Park, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/824,245

(22) Filed: Nov. 28, 2017

(51) Int. Cl.
*G11B 5/09* (2006.01)
*G11B 5/012* (2006.01)
*G11B 5/82* (2006.01)

(52) U.S. Cl.
CPC ............. *G11B 5/012* (2013.01); *G11B 5/82* (2013.01)

(58) Field of Classification Search
CPC .. G11B 5/00; G11B 5/02; G11B 20/10; G11B 27/36; G11B 2220/20; G11B 2220/90; G11B 5/09
USPC ............. 360/24, 25, 31, 39, 53, 55, 64
See application file for complete search history.

(56) References Cited

U.S. PATENT DOCUMENTS

| | | | |
|---|---|---|---|
| 5,379,160 A * | 1/1995 | Otani | G11B 20/18 360/49 |
| 5,974,521 A | 10/1999 | Akerib | |
| 7,024,102 B1 * | 4/2006 | Inoshita | G11B 27/105 386/208 |
| 8,705,194 B2 * | 4/2014 | Ho | G11B 5/59666 360/49 |
| 9,362,954 B1 | 6/2016 | Scridhara et al. | |
| 2010/0146363 A1 | 6/2010 | Birru et al. | |

* cited by examiner

*Primary Examiner* — Nabil Hindi
(74) *Attorney, Agent, or Firm* — Hollingsworth Davis, LLC (57) ABSTRACT

One or more detectors detect data from respective one or more analog sources operable to read from a storage medium. A buffer pool is between the decoders and two or more detectors. The decoders are simultaneously operable, via the buffer pool, to independently decode the data from the one or more detectors.

19 Claims, 6 Drawing Sheets

FIG. 10

DATA STORAGE DEVICE WITH ONE OR MORE DETECTORS UTILIZING MULTIPLE INDEPENDENT DECODERS

SUMMARY

The present disclosure is directed to a data storage device with a read channel utilizing multiple independent decoders. In one embodiment, one or more detectors detect data from respective two or more analog sources operable to read from a storage medium. A buffer pool is between the decoders and the one or more detectors. The decoders are simultaneously operable, via the buffer pool, to independently decode the data from the one or more detectors.

In another embodiment, a first unit of data is received via a first detector, the first detector being operable in parallel with a second detector. The first unit of data is decoded at a first decoder that is capable of being used by the first and second detectors. A second unit of data is received via the first detector. The second unit of data is decoded via a second decoder that is simultaneously operable in parallel with the first decoder and capable of being used by the first and second detectors. The first and second units of data are assembled into an output stream associated with the first detector. The output stream is sent to a host to fulfill a data storage request.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., hard disk drives (HDDs). Additional HDD features described herein, generally described as "parallelism" architectures are seen as a way to improve HDD performance measures such as IOPS and latency. Generally, parallelism architectures utilize multiple read/write heads in parallel. Such parallelism can increase the rate of input/output operations (IOPS) and thereby speed up certain operations. For example, the data read from two heads can be combined together into a single stream, thereby doubling the throughput rate of data sent to the host. In other examples, different heads can service different read or write requests at the same time, thereby reducing overall latency, e.g., for random data access requests.

In embodiments described below, a hard disk drive includes multiple heads driven by the same or different actuators that can read from or write to one or more disks simultaneously. This may include separate and independent reading/writing, such as heads that are servicing different read/write requests. This may also include separate and dependent reading/writing, e.g., where parts of a single stream of data are being handled by different heads at the same time. The parallelism architectures is extended to other components that operate in the HDD, including system controllers, servo controllers, read/write channels, host interfaces, caches, etc. While some embodiments are described herein as utilizing a magnetic disk and read/write heads for data storage, the parallelism implementations described below may be used for other types of storage media, such as flash memory used in solid-state drives (SSD).

A drive controller can be configured to support multiple, concurrent disk read/write transfers by replicating the conventional disk data path, with each path having a dedicated decoder, e.g., a low-density parity check (LDPC) decoder. However, in a multi-transfer drive, there are many cases where a first LDPC decoder is active while a second LDPC decoder is not, or is only lightly-loaded. Dedicated decoders each designed for worst-case decoding load causes an increase in the size and cost of the silicon wafers on which a system-on-a-chip (SoC) on which the decoders are formed. Pooling decoder resources between channels, and optionally implementing decoders with different power and performance attributes provides more effective use of decoder silicon resources.

Figure 1:
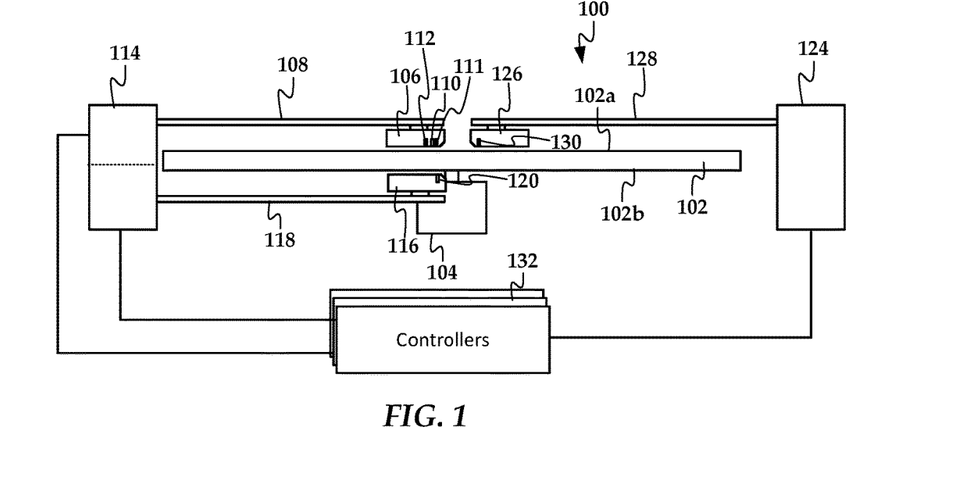
FIG. 1 is a diagram of an apparatus according to an example embodiment.

In FIG. 1, a diagram illustrates an apparatus 100 with parallelism features according to example embodiments. The apparatus 100 includes at least one magnetic disk 102 driven by a spindle motor 104. A head 106 (also referred to as a read/write head, read head, write head, recording head, etc.) is held over a first surface 102*a* of the disk 102 by an arm 108. An actuator 114 moves (e.g., rotates) the arm 108 to place the head 106 over different tracks on the disk 102. In one embodiment, the head includes one or more read transducers 110, 111 and/or a write transducer 112. The read transducers 110 are analog sources that provide signals in response to changing magnetic fields on the disk 102, and are coupled to a controller (not shown) where the separate signals are independently processed. The write transducer 112 receives signals from the controller and converts them to magnetic fields that change magnetic orientations of regions on the disk 102.

The apparatus 100 includes a second head 116 supported by a second arm 118. The second head 116 is held over a second surface 102*b* of the disk 102 and actuator 114 causes the second arm 118 to move to different tracks on the disk 102. The arm 118 may move together with arm 108, or the arms 108, 118 may move independently (as indicated by dashed line on actuator 114 indicating a split actuator). In either configuration, the arms 108, 118 rotate around the same axis. The head 116 also includes read and/or write transducers 120. The transducers 120 are capable of reading from and/or writing to disk surface 102*b* simultaneously with one or both of read/write transducers 110, 112 that access disk surface 102*a*.

In another embodiment, the apparatus 100 includes a third head 126 supported by a third arm 128. The third head 126 (and its associated actuation hardware) may be included instead of or in addition to the second head 116. The third head 126 is held over the first surface 102a of the disk 102 as a second actuator 124 causes the third arm 118 to move to different tracks on the disk 102. The arm 128 and actuator 124 move independently of arm 108 and actuator 114. The head 126 includes read and/or write transducers 130. The transducers 130 are capable of reading from and/or writing to disk surface 102a simultaneously with transducers 110, 112 of first head 106.

In the examples shown in FIG. 1, more than one disk 102 may be used, and the actuators 114, 124 may be coupled to additional heads that access some or all of the additional disk surfaces. In this context, "accessing" generally refers to activating a read or write transducer and coupling an analog signal of the transducer to a read/write channel. Independently movable heads that utilize a split actuator 114 may generally simultaneously access different surfaces, e.g., heads 106 and 116 access different surfaces 102a, 102b at the same time. Independently movable heads that utilize non-coaxial actuators 114, 124 may access the same surface at the same time, e.g., heads 106 and 126 may both access surface 102a at the same time, as well as accessing different surfaces at the same time. Note that head 106 may also be considered to include parallelism features, in that the two heads 110, 111 read independent streams of data, albeit while being held over the disk at a predetermined radial offset from one another.

One or more controllers 132 are coupled to the respective actuators 114, 124 and control movement of the actuators 114, 124. The controllers 132 may include SoC that perform such operations as servo control, encoding and decoding of data written to and read from the disk 102, queuing and formatting host commands, etc. As pertains to the discussion below, the one or more controllers 132 have the ability to execute multiple media read/write operations concurrently. As noted above, similar arrangements may be used for other recording media than magnetic disks, such as solid-state persistent memory. Therefore, while terms such as "sector," "surface," etc., may be used to describe data storage drive features below, it will be understood that the concepts may also be applicable to analogous terms commonly used in describing persistent solid-state memory storage devices, such as "pages," "memory chips/die," etc.

For an apparatus 100 such as the illustrated disk drive, the parallelism features can be used to, e.g., scale input/output (I/O) performance with the increasing capacity that has resulted from advances in areal density. The electronics required by these parallel-transfer drives includes read channels that can independently read and write, and decode and encode, multiple data streams. Such electronics can be implemented with configurations using multiple instances of single-channel SoCs, or using SoCs with multiple disk channels. This disclosure applies to the latter option, wherein an SoC contains two or more LDPC decoders, each coupled to a read channel signal processing and detector subsystem referenced henceforward as a "read channel" (or "RC" in the figures).

Figure 2:
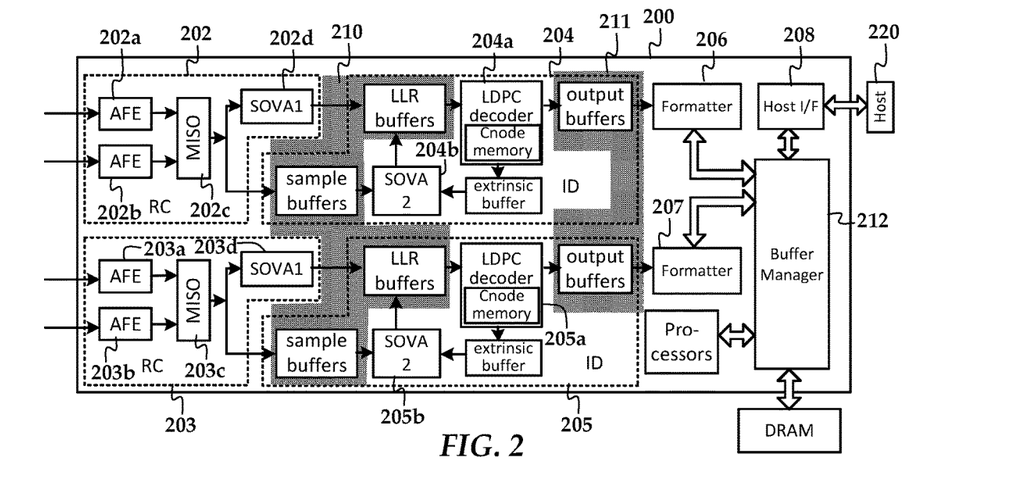
FIG. 2 is a block diagram showing a multi-channel, system-on-a-chip according to an example embodiment.

In FIG. 2, a block diagram shows a multi-channel SoC 200 according to an example embodiment. The SoC 200 includes at least one error control iterative decoder and encoder subsystem, referenced henceforward as an "iterative decoder" or "decoder ("ID" in the figures). Two iterative decoders 204, 205 are coupled to two corresponding read channels 202, 203 and formatters 206, 207. Each iterative decoder 204, 205 and read channel 202, 203 include encoding and decoding paths, however for clarity in the drawings, only the decoding paths are illustrated. Each read channel 202, 203 includes two analog front ends (AFEs) 202a-b, 203a-b, respectively, that receive separate signals from analog sources that access a recording media. Each read channel 202, 203 also includes a multiple-input, single output (MISO) detector 202c, 203c, and a first stage of a soft-output Viterbi algorithm (SOVA) processor 202d, 203d. Note that one or both read channel 202, 203 may include a single AFE and single input detector instead of the illustrated multiple AFE and MISO detectors.

Each iterative decoder includes an LDPC decoder 204a, 205a, various buffers, and SOVA processing (SOVA2) 204b, 205b for subsequent stages of decoder iteration. Although SOVA2 204b, 205b may be physically implemented in the read channel 202, 203, this partitioning is more due to logistics than architecture. Herein they are shown in their architectural role as part of the iterative decoders 204, 205. The data is formatted by the formatters 206, 207 before being transferred to a host 220 via the host interface 208. The formatters 206, 207 may arrange the data into a desired sequence, add metadata used by the buffer manager 212 and/or host, etc.

In a parallel-transfer drive, there are cases of operation where a first LDPC decoder is active while a second LDPC decoder is not, or is only lightly-loaded. For example, the actuator associated with the one of the channels could be seeking. In other cases, a logical unit number (LUN) (or range of LBAs where LUN in not supported) associated with one of the channels may not have any read commands pending at the time. Even in situations where both channels are simultaneously executing read operations, if sectors (or other units of data) converge quickly, one or both decoders could be idle much of the time.

As indicated generally by shaded areas 210, 211 buffer resources within iterative decoder 204, 205 can be shared between the first and second read channel sections such that the LDPC decoders 204a, 205a can decode data from either channel. The pooled decoder resources 210, 211 allow resources that would otherwise be left idle to be put to use in ways that benefit the operation of the drive. An example arrangement of the shared resources 210, 211 is shown in the block diagram of FIG. 3. Generally, the shared resource 210 between the read channels 202, 203 and iterative decoders 204, 205 include a log likelihood ratio (LLR) buffer pool 300 and a sample buffer pool 302. The LLR buffer pool 300 stores soft information derived by the SOVA, the soft information being expressed as log(probability(1)/probability(0)). The sample buffer pool 302 stores digital samples from the respective detectors 202c, 203c.

Figure 3:
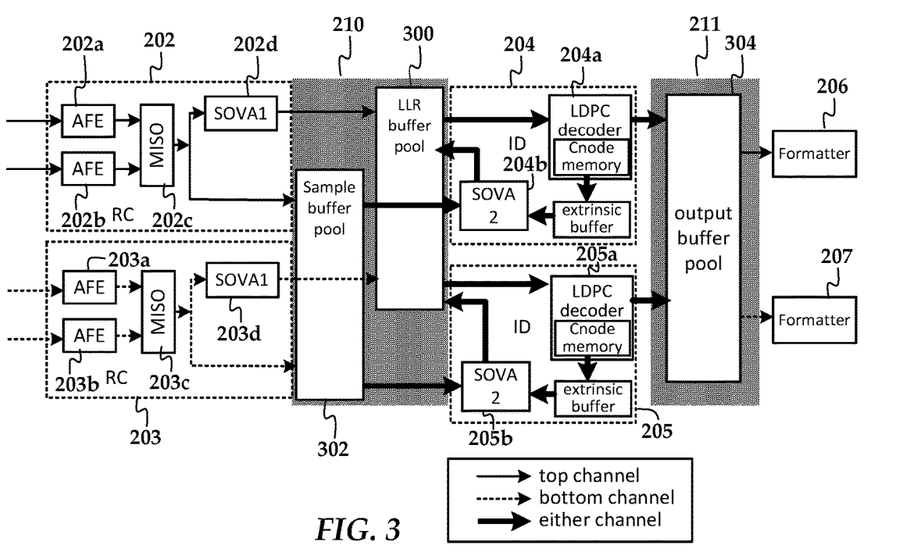
FIG. 3 is a block diagram showing shared resources of a multi-channel, system-on-a-chip according to an example embodiment.

As indicated by the legend in FIG. 3, the thin solid and thin dashed lines represent information specific to the top and bottom channels (e.g., corresponding to read channels 202 and 203, respectively). The thick, solid lines represent information that may be processed by either iterative decoder. Read signal samples and LLR soft detection information from the read channels 202, 203 are loaded into sets of buffers 300, 302 accessible to both LDPC decoders 204a, 205a. The extrinsic output of both LDPC decoders 204a, 205a is written to buffers in the LLR pool 300 via SOVA 2&3 204b, 205b. Outputs of the LDPC decoders are written into an output buffer pool 304 from which both formatters 206, 207 source the read data from media regions associated with the top and bottom channels.

Figure 4:
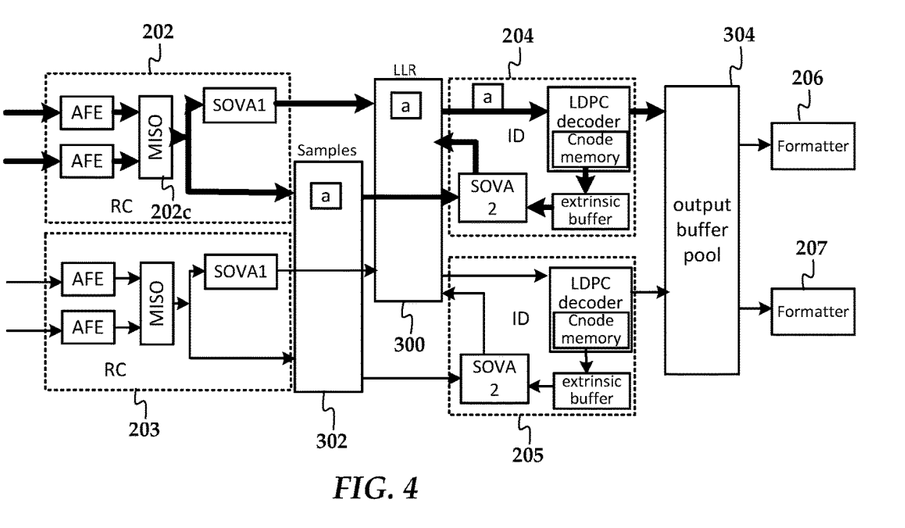
FIGS. 4, 5, and 6 are block diagrams showing processing of data on multiple channels according to an example embodiment.
Figure 5:
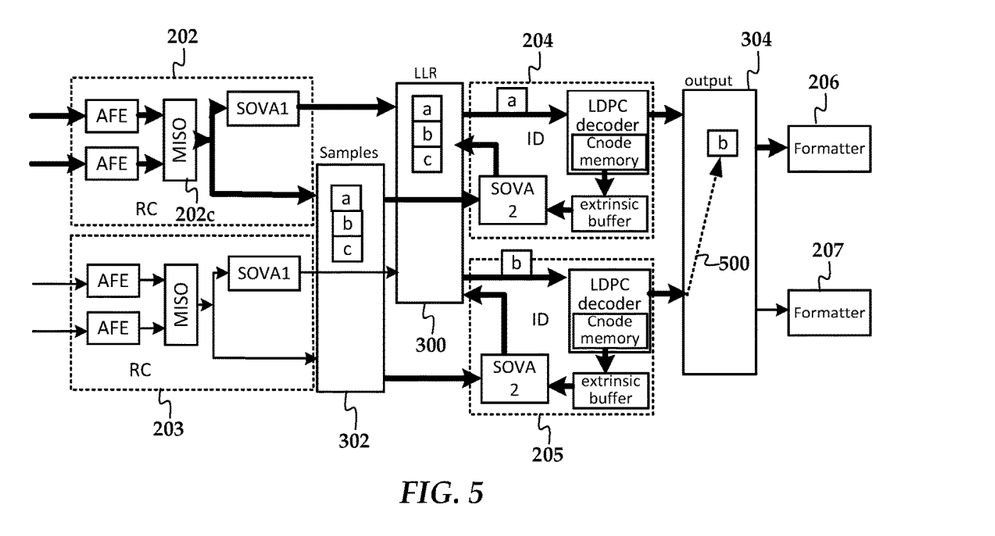
Figure 6:
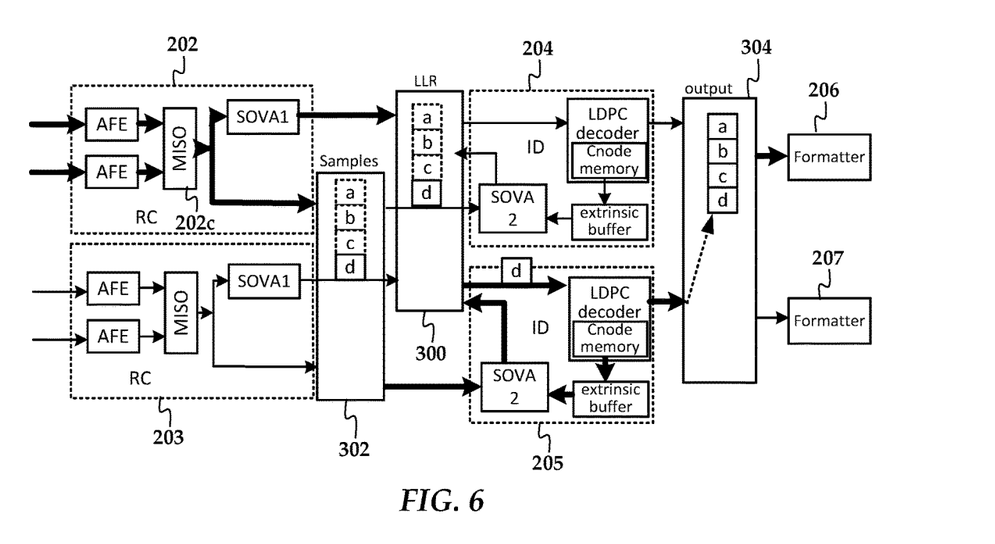

This pooling of buffer resources between two iterative decoders 204, 205 enables both LDPC decoders to be used to process read data from either of two media regions (e.g., different active surfaces, different logical block address ranges, different media die) in a parallel transfer drive. The encoder and write data paths may remain as dedicated paths. In FIGS. 4-6, a series of block diagram illustrates the processing of data using multiple decoders according to an example embodiment. In these figures, thick lines indicated active processing paths and thin lines indicate idle processing paths. The data from one read channel 202 will be shown being processed by two iterative decoders 204, 205 operating on buffers in the commonly-accessible buffer pools 300, 302. While the description below of these figures describe detecting and decoding of sectors, the data units decoded may be of different granularity of a single sector or page, e.g., partial sector, multiple sectors, etc.

As seen in FIG. 4, while the lower read channel 203 is idle, the upper read channel 202 is reading and has loaded sample and soft information buffers for sector "a." The upper iterative decoder 204 is iterating on the information, which has not yet converged. In FIG. 5, the LDPC decoding of sector "a" still hasn't converged, yet information from subsequent sectors ("b" and "c" in this example) continues to be read by the upper read channel 202 and loaded into the pool of buffers 302, 300 for samples and soft information. To alleviate the growing backlog, the lower iterative decoder 205 starts LDPC decoding of sector "b", which converges quickly and the decoded output is written into the output buffer pool 304 (as indicated by dashed line 500), while the upper decoder continues to iterate on "a".

As seen in FIG. 6, the lower decoder has successfully decoded sectors "b" through "d", and written the decoded data to the output buffer pool 304. Meanwhile, the decoding of sector "a" has finally converged, and the upper decoder has written it to the output buffer pool 304. Now sectors "a" thru "d" are available for in-order transfer into the formatter 206 and onto the rest of the SoC data path. The upper iterative decoder 204 is now free to resume decoding output from the upper read channel 202 (or, for that matter, from the lower read channel 203).

Figure 7:
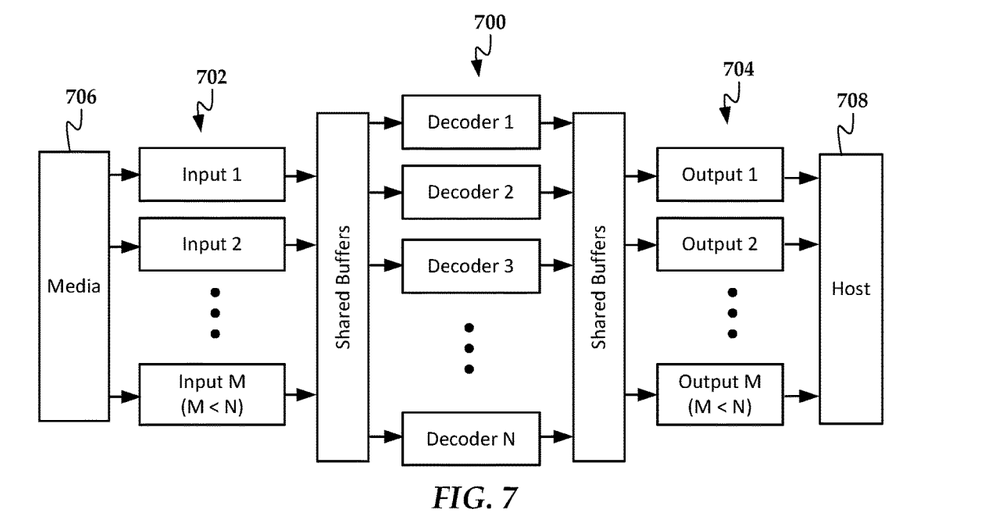
FIGS. 7 and 8 are block diagrams showing multiple decoder arrangements according to example embodiments.

The concept of resource pooling can be extended to allow flexible allocation of decoder processing resources as well. In FIG. 7, a block diagram illustrates a symmetric pooling arrangement according to an example embodiment. This embodiment implements a pool of N-decoders 700, where N is greater than the degree of transfer parallelism, shown as M-inputs and M-outputs 702, 704 in FIG. 7. Generally, the degree of parallelism sets the maximum number of simultaneous input and output streams processed by the read/write channels. Thus the arrangement shown in FIG. 7 can simultaneously send M-output streams from a recording media 706 to a host 708. Each of the inputs 702 may include components of the previously illustrated read channel, e.g., detectors, AFE, SOVA 1, etc. Each of the outputs 704 may include formatters as previously shown, e.g., in FIG. 2. Each of the decoders 700 could be of lower performance (thus using lower power) than that of a single decoder designed to maintain throughput of a single channel.

Decoders 700 would be activated from their idle state as required by workload needs and quality of data. For example, when reading from a single media section, or when high-quality data is read from two media sections, only one decoder may need to be activated. If a poor quality sector is encountered in one of the data streams, a second decoder may be activated to decode subsequent sectors while the first decoder continues iterating on the difficult sector. If the aggregate quality of both streams results in decoding times that create an accumulating backlog of information in the input buffer pool, a third decoder can be activated to help service the backlog. In such a system, the decoder system only consumes the power needed to meet the dynamic demands of the workload at any given time.

Figure 8:
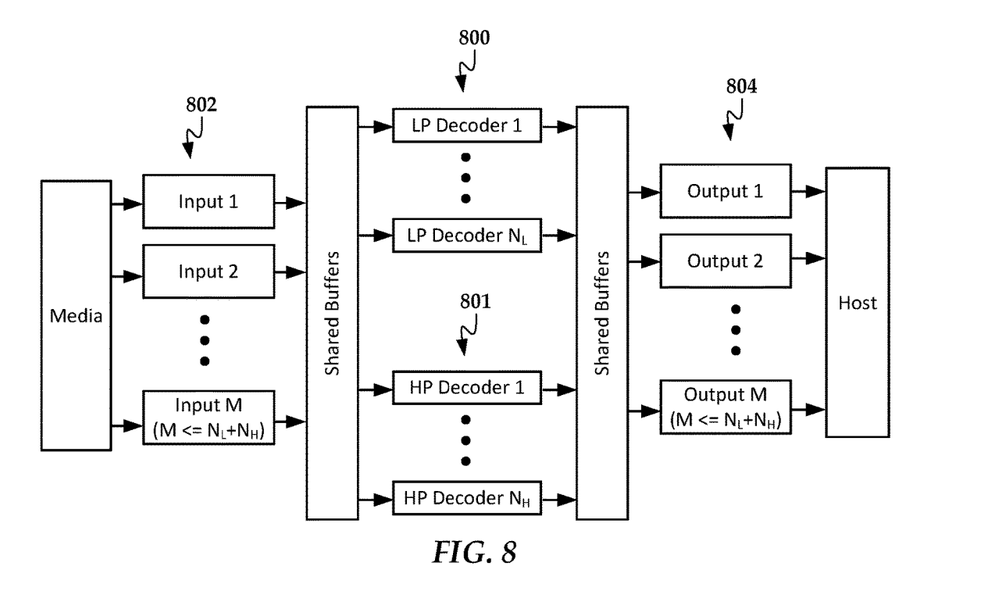

In FIG. 8, a block diagram illustrates an asymmetric pooling arrangement according to an example embodiment. In this arrangement, a pool of decoder engines with different processing power would be implemented. As shown in the figure, one or more "LP" decoders 800 with low performance and power, and one or more "HP" decoders 801 with high performance and power. Note that the number of these decoders 800, 801 may be one, e.g., $N_L \geq 1$ and $N_H \geq 1$. An HP decoder 801 would be activated to decode a sector when metrics calculated on incoming soft information indicates a poor quality sector likely to need more iterations than normal to converge. Otherwise, an LP decoder 801 would be used for decoding. The degree of parallelism as indicated by total number of input sections 802 and output sections 804 may be less than or equal to the total number of decoders.

A quality metric used to select an HP or LP decoder as in FIG. 8 can be calculated from the sum of LLR magnitudes, or the number of LLRs with magnitude below a programmed threshold. The HP decoder could also be called into service if the LP decoder(s) being used by default create an unexpected backlog of input information. Note that this type of quality metric can also be used in the arrangement shown in FIG. 7, e.g., to choose multiple decoders 700 based on expected or actual difficulty in decoding.

Generally, the use of shared resources as described above allows tasking any of a plurality of LPDC decoders with the decoding of sectors output by any of the read channels. This can be used in a number of scenarios. For example, if a first LDPC decoder is bogged down iterating on a difficult sector, an idle or lightly-loaded second decoder can process information for subsequent sectors output from the same read channel. In general, sectors from any read channel can be decoded by any available decoder in a multi-decoder system. If the decoding required for the number of surfaces (or other media portion) being read leaves a decoder idle, deferred decoding can commence without delay while a previously idle decoder is activated to execute real-time decoding of subsequently read sectors.

The examples illustrated in FIGS. 7 and 8 show N decoders used with M detectors, where N>M. This may be extended to case where M=1, such that a single detector can select from multiple available decoders. In such a case it may be applied to non-parallelism type devices, e.g., a device that reads one data stream at a time. It is also possible in some embodiments to have more detectors than decoders, such that M>N. For example, a set of very fast decoders could keep up with the output of a larger number of detectors. In such a case, the decoders could still be pooled, e.g., allocated to any of the detectors as needed.

In embodiments described above, sector decoding can be prioritized as per the relative urgency of data delivery as indicated by a temperature/priority assigned to the data. Commands may have time limits associated with them. If a command is approaching its time limits (e.g., error recovery time or command aging limits), its data would be tagged as "hot," resulting in the hot command being given a higher priority and heightened allocation of decoding resources, e.g., by assigning its decoding to a high-performance decoder. Similarly, if "hot" or "warm" latency-critical data is being read from one surface while "cold" data for internal background operations is being read from another, available decoder resources would first be allocated to the warmer data, while the cold data would be decoded with whatever resources are left over, possibly incurring missed revs as decoder resources are consumed by the more critical data.

Figure 9:
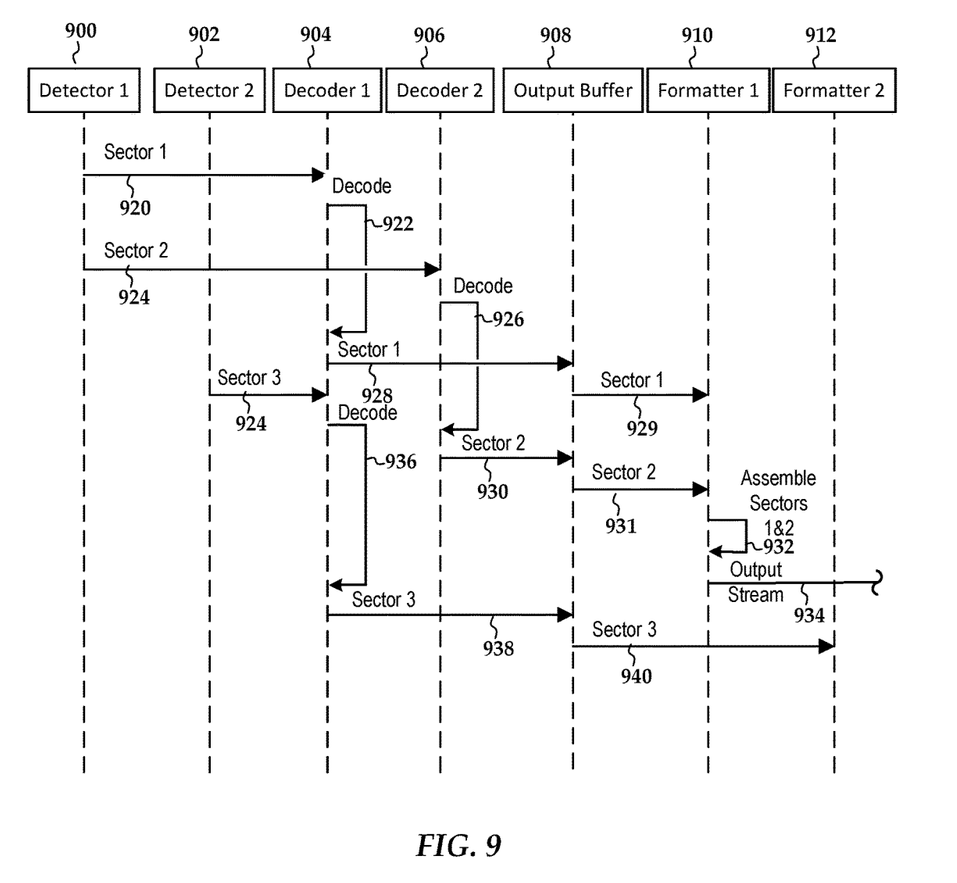
FIG. 9 is a sequence diagram illustrating a method according to an example embodiment.

In FIG. 9, a sequence diagram illustrates a method according to an example embodiment. An SoC includes first and second detectors 900, 902, first and second decoders 904, 906, an output buffer 908, and first and second formatters 910, 912. The first and second detectors 900, 902 are operable in parallel, as are the first and second decoders 904, 906 and formatters 910, 912. A first sector of data 920 is received via the first detector 900, and is decoded 922 at the first decoder 904. Note that, until decoding is finished, the first decoder 904 will be unavailable.

A second sector of data 924 is received via the first detector 900, and is decoded 926 by the second decoder 906 that is simultaneously operable in parallel with the first decoder 904. As indicated by paths 928-931, the first and second sectors are placed in the output buffer 908 and accessed from the output buffer via the first formatter 910. The first and second sectors of data are assembled 932 into an output stream 934 associated with the first detector 900. The output stream 934 is sent to a host (not shown; see host 220 in FIG. 2) to fulfill a data storage request.

In this sequence, the second detector 902 receives a third sector of data 924. Since the second decoder 906 is currently decoding 926 the second sector, the third sector is decoded 936 by the first decoder 904. The decoded third sector is ultimately written 938 to the output buffer 908 where it will be accessed 940 by the second formatter to ultimately form a second output stream (not shown). The second output stream will be associated with the second detector 902. Note that the first and second detectors 900, 902 will be associated with different portions of memory (e.g., disk surfaces, memory die). As such, the association between the detectors 900, 902 and various output streams will be based on channel-specific data attached to the data request, such as physical and/or logical addresses uniquely associated with the different memory portions.

Figure 10:
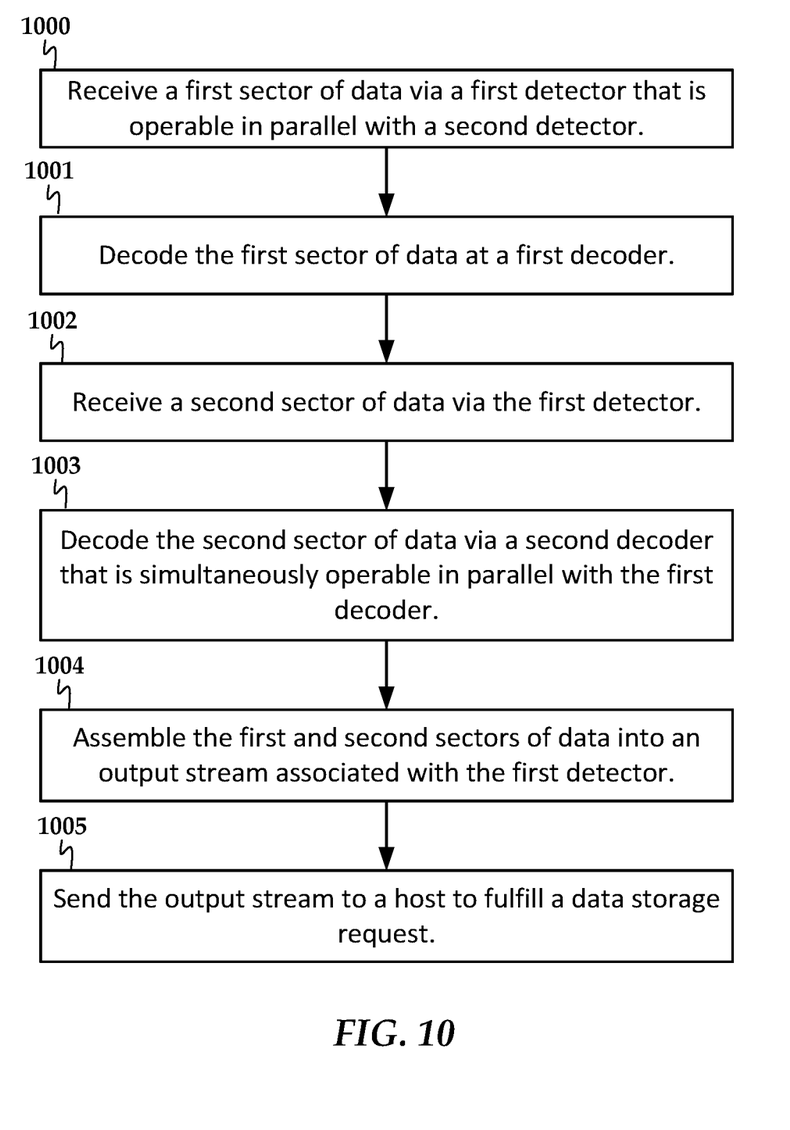
FIG. 10 is a flowchart of a method according to an example embodiment.

In FIG. 10, a flowchart illustrates a method according to an example embodiment. The method involves receiving 1000 a first sector of data via a first detector that is operable in parallel with a second detector. The first sector of data is decoded 1001 at a first decoder. The first decoder is capable of being used by the first and second detectors. A second sector of data is received 1002 via the first detector and decoded 1003 via a second decoder that is simultaneously operable in parallel with the first decoder and also capable of being used by the first and second detectors. The first and second sectors of data are assembled 1004 into an output stream associated with the first detector. The output stream is sent 1005 to a host to fulfill a data storage request.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus, comprising:
   two or more detectors that simultaneously detect data from respective two or more analog sources operable to read from a storage medium;
   two or more decoders;
   a buffer pool between the decoder and the detectors, the decoders being simultaneously operable, via the buffer pool, to independently decode the data from any of the two or more detectors;
   an output buffer pool coupled to the decoders; and
   two or more formatters coupled to the output buffer pool, the formatters identifying respective channel-specific data and assembling same into output streams associated with respective ones of the analog sources.

2. The apparatus of claim 1, wherein the storage medium comprises one or more magnetic disks and the two or more analog sources comprise two or more read heads.

3. The apparatus of claim 1, wherein the decoders comprise low-density parity check decoders, and the buffer pool comprises a log-likelihood ratio buffer pool that stores soft information and a sample buffer pool that stores digitized read signal samples.

4. The apparatus of claim 3, wherein the two or more detectors are coupled to the log-likelihood ratio buffer pool via respective one or more first-stage, soft-output Viterbi algorithm processors.

5. The apparatus of claim 1, wherein the two or more decoders comprise N decoders and the one or more detectors comprise M detectors, wherein N>M.

6. The apparatus of claim 5, wherein the N decoders each have a lower performance than that of a single decoder designed to maintain throughput of a single channel.

7. The apparatus of claim 1, wherein a first of the two or more decoders has a higher performance than that of a second of the two or more decoders.

8. The apparatus of claim 7, wherein the first decoder is selected responsive to incoming soft information indicating a poor quality sector.

9. The apparatus of claim 7, wherein the first decoder is selected responsive to the data having a high priority relative to other data requests being processed by the apparatus.

10. The apparatus of claim 1, wherein the two or more analog sources comprise first and second read transducers incorporated into a single head.

11. A method comprising:
   receiving a first unit of data via a first detector, the first detector being operable in parallel with a second detector;
   decoding the first unit of data at a first decoder that is capable of being used by the first and second detectors;
   receiving a second unit of data via the first detector;
   decoding the second unit of data via a second decoder that is simultaneously operable in parallel with the first decoder and capable of being used by the first and second detectors; and
   assembling the first and second units of data into an output stream associated with the first detector, the output stream being sent to a host to fulfill a data storage request.

12. The method of claim 11, wherein the processing of the second unit of data via the second decoder is in response to the first detector not converging on the first detector before the second unit is received.

13. The method of claim 11, wherein the first detector is coupled to a first read head that reads from a first surface of at least one disk and the second detector is coupled to a second read head that reads from a second surface of the at least one disk, the first and second read heads operable to simultaneously read from the respective first and second surfaces.

14. The method of claim 11, wherein the first and second units are stored in an output buffer pool coupled to the first and second decoders, a first formatter coupled to the output buffer pool assembling the first and second units of data into the output stream associated with the first detector.

15. The method of claim 11, wherein the first and second decoders comprise low-density parity check decoders, the method further comprising:
   storing digitized read signal samples from the first and second detectors a sample buffer pool coupled to the first and second detectors and the first and second decoders; and
   storing soft data from the first and second decoders in a log-likelihood ratio buffer pool, wherein the first and second detectors and the first and second decoders can access the sample buffer pool and the log-likelihood ratio buffer pool.

16. The method of claim 15, wherein the first and second detectors are coupled to the log-likelihood ratio buffer pool via respective first and second first-stage, soft-output Viterbi algorithm processor.

17. The method of claim 11, wherein the first decoder has a higher performance than that of the second decoder.

18. The method of claim 17, further comprising selecting the first decoder for the first unit responsive to incoming soft information indicating the first unit is of poor quality.

19. A system, comprising:
   a magnetic disk;
   two or more read heads operable to simultaneously read data from the magnetic disk;
   two or more detectors operable to simultaneously detect data from the respective two or more read heads;
   two or more decoders;
   a buffer pool between the decoders and the detectors, the decoders being simultaneously operable, via the buffer pool, to independently decode the data from any of the two or more detectors;
   an output buffer pool coupled to the decoders; and
   two or more formatters coupled to the output buffer pool, the formatters identifying respective channel-specific data and assembling same into output streams associated with respective ones of the read heads.

* * * * *